3,573,296
Patented Mar. 30, 1971

3,573,296
PROCESS FOR THE PREPARATION OF 7-AMINOCEPHALOSPORANIC ACID
David Aaron Johnson, Fayetteville, Elwin J. Richardson, Kirkville, John McKenna Roubie and Herbert Horatius Silvestri, Syracuse, and Richard Root Smith, Fayetteville, N.Y., assignors to Bristol-Myers Company, New York, N.Y.
No Drawing. Filed July 1, 1968, Ser. No. 741,351
Int. Cl. C07d 99/24
U.S. Cl. 260—243
11 Claims

ABSTRACT OF THE DISCLOSURE 7-aminocephalosporanic acid, a valuable intermediate for the preparation of semi-synthetic cephalosporins, is prepared by a process comprising the consecutive steps of:

(A) Acylating cephalosporin C broth with a haloformate to produce a compound called N-(carb-alkyl or aryloxy)cephalosporin C having the formula

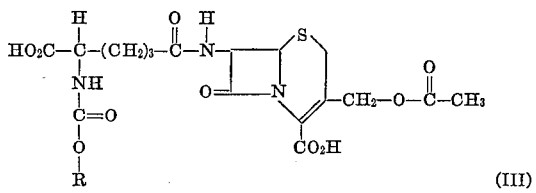

in which R is (lower)alkyl or aryl;

(B) Recovering derivative III by solvent extraction;

(C) Silylating the carboxyl functions of compound III to form silyl esters;

(D) Halogenating the silyl ester of compound III to produce an imino-halide;

(E) Forming an imino-ether from the imino-halide by treatment with an alcohol; and (F) Mixing said imino-ether with water or an alcohol to produce 7-aminocephalosporanic acid (7–ACA).

BACKGROUND OF THE INVENTION

(1) Field of the invention

This invention relates to a novel process for the "in situ" preparation, subsequent harvesting and conversion of cephalosporin C derivatives into 7–ACA.

It is thus an object of the present invention to provide a new and improved process for the preparation of 7–ACA.

(2) Description of the prior art

Recovery methods for cephalosporin C from fermentation broth are described in U.S. Pats. Nos. 3,093,638 and 3,094,527 wherein the processes described involve adsorption of the cephalosporin C onto an adsorbant as compared to solvent extraction. While (lower)alkyloxycarbonyl- or aryloxycarbonyl-cephalosporin C derivatives are not described as being formed "in situ" in cephalosporin C fermentation broth, or as being useful to aid in the extraction of cephalosporin C from its broth, or as being useful as a starting material in the production of 7–ACA, some of these compounds are described in the patent literature (British Patent 1,014,883 and U.S. Patent 3,227,709) as antibiotics. Several processes for the chemical cleavage of cephalosporin C or certain of its derivatives are described in the patent literature (U.S. Pats. Nos. 3,188,311, 3,234,223 and 3,124,576 and British Patent 1,041,985). None of these processes employ the use of N-(lower)alkyloxycarbonylcephalosporin C and a silyl ester thereof as a starting material.

SUMMARY OF THE INVENTION

This invention relates to and has for its object the provision of an improved process for the "in situ" preparation and recovery of a cephalosporin C derivative, said derivative being utilizable in a chemical cleavage, as its silyl ester, to 7-aminocephalosporanic acid.

7-aminocephalosporanic acid (7–ACA) is a most valuable intermediate in the preparation of a multitude of semi-synthetic cephalosporanic acid antibacterial agents. In view of the impracticability of the total synthesis of 7–ACA on a large scale, commercial supplies of the compound are prepared by the chemical degradation of naturally occurring cephalosporanic acids, i.e., cephalosporin C, which is produced by fermentation. Most 7–ACA is derived from cephalosporin C (U.S. Patent 3,093,638) which has the structure

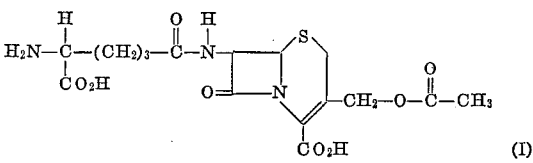

(I)

The production of 7–ACA by currently available methods is fraught with difficulties from the fermentation to the chemical cleavage of cephalosporin C. Low yields of 7–ACA have made it difficult for cephalosporanic acids to take their rightful place in antibiotic therapy. For this reason the processes of the present invention are a significant improvement over the methods of the prior art.

Cephalosporin C is characterized by an amino-acid function in its side chain. The amino-acid exists in the form of a zwitterion in aqueous solution and as such is very water soluble. Because of its highly ionic nature, it is extremely difficult to harvest by solvent extraction of the fermentation broth. The harvesting procedure currently used involves the adsorption of the crude cephalosporin C from the fermentation broth onto a suitable adsorbant, i.e., charcoal, an ion exchange resin, or the like, followed by elution, concentration and precipitation at the isoelectric point or by salt formation (U.S. Pat. No. 3,094,527). The low degree of efficiency coupled with the complexity of each step in this process combine to make it very difficult to manufacture 7–ACA.

The building block of the semi-synthetic cephalosporins is 7–ACA, whose structure is shown below:

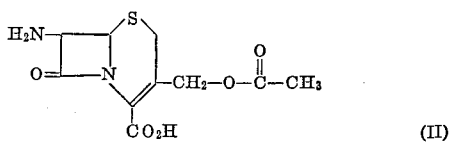

(II)

Most 7–ACA is prepared by partial degradation of cephalosporin C or its derivatives by chemical means (U.S. Pats. Nos. 3,124,576, 3,188,311 and 3,234, 223).

Again, most of these methods provide commercial yields that are undesirably low. Furthermore, these methods invariably employ as the starting material a purified form of cephalosporin C which is difficult to obtain.

It was therefore an object of the present invention to improve on the harvestable yields of cephalosporin C from its fermentation broth in such a chemical form as to be directly useable in subsequent cleavage reactions to produce 7–ACA without substantial purification procedures.

The object of the present invention has been achieved by the provision, according to the present invention, of the process for the "in situ" preparation and harvesting of a derivative of cephalsosporin C having the formula

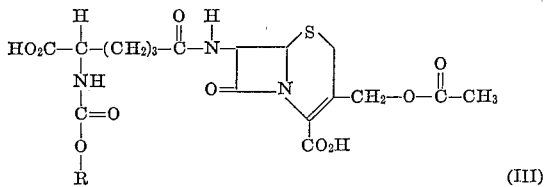

wherein

R is (lower)alkyl but preferably ethyl, n-propyl, isopropyl, n-butyl or isobutyl; or an aralkyl group of the formula

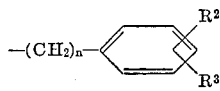

wherein $n$ is an integer of 1 to 6 and $R^2$ and $R^3$ are alike or different and each is H, Cl, Br, F, $NO_2$, (lower)alkyl or (lower)alkoxy, but preferably hydrogen;

which comprises the consecutive steps of:

(A) Adding a haloformate having the formula

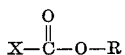

in which X is chloro, bromo, or iodo and R is as defined above, to a previously filtered and acid-incubated fermentation broth containing cephalosporin C, in a ratio of at least 2 moles of haloformate per mole of cephalosporin C, but preferably in a ratio of about 2 to 10 moles of haloformate per mole of cephalosporin C, and most preferably 5 to 8 moles of haloformate per mole of cephalosporin C, at a pH of about 7 to 9, but preferably about 8, at a temperature in the range of about $-20°$ to 60° C., but preferably in the range of about $-5°$ C. to about 20° C. to form said derivative of cephalosporin C.; and (B) Recovering said derivative of cephalosporin C, preferably by extraction using a water-immiscible organic solvent such as methyl isobutyl ketone, butanol, ethyl acetate, or the like, but preferably methyl isobutyl ketone, at a pH of about 1 to 3, but preferably about pH 2.

The term "(lower)alkyl" for the purpose of the present invention is defined as an alkyl group comprised of 1 to 10 carbon atoms, including for example, methyl, ethyl, n-propyl, isopropyl, n-butyl, isobutyl, t-butyl, n-pentyl, etc., and the like, but especially methyl, ethyl, n-propyl, isopropyl, n-butyl and isobutyl. The terms "(lower)alkoxy" and "halo(lower)alkyl" are also defined as moieties containing 1 to 10 carbon atoms.

The fermentation of the mold known as cephalosporium, or a mutate thereof, produces a mixture of compounds, predominately cephalosporin C and lesser amounts of cephalosporin N (now known to be a penicillin). Cephalosporin C is acid stable while cephalosporin N is not. Accordingly, prior to the reaction of the fermentation broth with a haloformate, it is desirable to destroy in situ any co-produced cephalosporin N. This is accomplished by acidification to about pH 2 with a mineral acid such as hydrochloric acid, sulfuric acid, phosphoric acid, or the like, followed by an incubation period of about 2 to 20 hours. The fermentation broth may be filtered before or after acidification and incubation.

Following this step, the filtrate-fermentation broth containing the cephalosporin C is adjusted to about pH 7 to 9, but preferably about 8, by the addition of an alkali metal base such as sodium or potassium hydroxide.

The volume of the prepared broth is increased about 25% by the addition of acetone. The haloformate is added to this solution with stirring in a ratio of at least 2, preferably about 2 to 10 moles of haloformate per mole of cephalosporin C (broth concentration having been predetermined) but more preferably in a ratio of about 5 to 8 moles. The pH is held constant during the slow addition and for at least 30 minutes following the addition. The temperature of the broth is maintained below 40° C., but preferably at 0° C. to 15° C. during this time. The reaction is usually complete one hour after the addition is completed.

One-half volume of an immiscible organic solvent is added, preferably methyl isobutyl ketone (MIBK), and the pH is adjusted to about 1 to 3, but preferably 2. The mixture is stirred and the organic solvent phase containing the cephalosporin C derivative III is collected.

The organic solution is concentrated in vacuo to about one-third its original volume at a temperature not to exceed 40° C. The concentrate is cooled to about 20° C. to 30° C. and the sodium salt of the cephalosporin derivative III is precipitated by the addition of a slight excess of sodium 2-ethylhexanoate dissolved in MIBK. The mixture is cooled to 0° C. to 5° C. for 3 to 4 hours and the solid sodium salt of derivative III is collected by filtration. The filter cake is washed with cold MIBK followed by a n-hexane washing. The product is dried in vacuo at about 25° C.

It is another object of the present invention to provide a superior process for the preparation of 7-ACA which is capable of using the compounds having Formula III without the necessity of preliminary purification or chemical conversion to cephalosporin C.

This object of the present invention has been achieved by the provision according to the present invention, of the process for the preparation of 7-aminocephalosporanic acid which comprises the consecutive steps of:

(A) Mixing a compuond having the formula

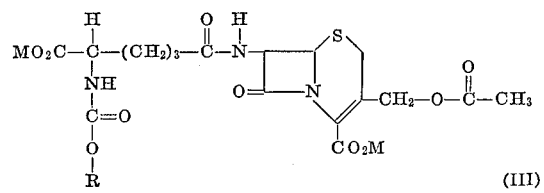

in which each M is selected from the group consisting of hydrogen, metal and amine cations, and R is (lower)alkyl, but preferably ethyl, n-propyl, isopropyl, n-butyl and isobutyl; or an aralkyl group of the formula

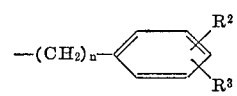

wherein $n$ is an integer of 1 to 6 and $R^2$ and $R^3$ are alike or different and each is H, Cl, Br, F, $NO_2$, (lower)alkyl or (lower)alkoxy, but preferably hydrogen;

with at least two equivalents of a silyl compound of the formula

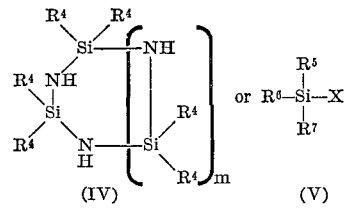

wherein $R^5$, $R^6$ and $R^7$ are selected from the group consisting of hydrogen, halogen, (lower)alkyl, halo(lower)alkyl and phenyl, at least one of the said $R^5$, $R^6$ and $R^7$ groups being other than halogen or hydrogen; $R^4$ is (lower)alkyl, m is an integer of 1 to 2 and X is selected from the group consisting of halogen and

wherein

R⁸ is hydrogen or (lower)alkyl and R⁹ is hydrogen, (lower)alkyl or

but preferably dimethyldichlorosilane or trimethylchlorosilane;

under anhydrous conditions in the presence of an acid deactivating tertiary amine selected from the group consisting of triethylamine, dimethylaniline, quinoline, lutidine, pyridine, or the like, in an inert solvent selected from the group consisting of methylene chloride, dichloroethane, chloroform, tetrachloroethane, nitromethane, diethylether, or the like, to produce the corresponding silyl diester of compound III.

(B) Mixing said silyl ester with a halogenating agent selected from the group consisting of phosphorous pentachloride, phosphorous pentabromide, phosphorous trichloride, phosphorous tribromide, oxalyl chloride, p-toluenesulfonyl halide, phosphorous oxychloride, phosgene, or the like, in a molar ratio of 2 or more moles of halogenating agent per mole of silyl ester, but preferably about two moles, under anhydrous conditions in an inert solvent such as methylene chloride, dichloroethane, chloroform, tetrachloroethane, nitromethane, diethyl ether or the like, in the presence of an acid deactivating tertiary amine selected from the group consisting of triethylamine, dimethylaniline, quinoline, lutidine, pyridine or the like, at temperatures below 0° C., but preferably in the range of —40° C. to —60° C., to produce in solution the corresponding imino-halide;

(C) Mixing with said solution of imino-halide an alcohol selected from the group consisting of aliphatic alcohols having 1 to 12 carbon atoms and phenylalkyl alcohols having 1 to 7 alkyl carbon atoms, at a temperature below 0° C., but preferably —40° C. to —70° C., to produce in the solution the corresponding imino-ether; and (D) Mixing said solution of imino-ether under acidic conditions with water or an aliphatic alcohol, or a mixture of both, to produce 7-aminocephalosporanic acid.

The process of the invention unexpectedly produces high yields under both laboratory and commercial scale conditions. The yields, which may be in the order of 50% to 70%, are attributed to the use of silyl esters on the carboxyl groups of the compounds of Formula III. The silyl esters may be prepared and hydrolyzed to the acid again without the loss of product, especially if the reaction proceeds at the temperatures below —20° C., preferably —40° C. to —70° C., during formation of the iminoether. Moreover, the use of silyl esters rather than the esters employed in the previously cited patents simplifies the process since the silyl ester hydrolyzes simultaneously with the splitting of the double bond of the imino-group and avoids the separate step of splitting the 4-carboxylic esters of the prior art processes.

The formation of the silyl ester is accomplished by reacting a silyl compound of Formula IV or V, under anhydrous conditions, in an inert organic solvent, with the compound of Formula III, or a salt thereof, in the presence of an acid deactivating tertiary amine.

Suitable inert solvents include amongst others methylene chloride, dichloromethane, chloroform, tetrachloroethane, nitromethane, benzene and diethyl ether.

Suitable salts of Compound III include amongst others alkali metal and alkaline earth metal salts such as potassium, sodium, calcium, aluminum etc. Also acceptable are ammonium and amine salts, preferably tertiary amines such as triethylamine, dibenzylamine, trimethylamine, N-methylmorpholine, pyridine, N-benzyl-β-phenethylamine, 1-ephenamine, N,N'-dibenzylethylene-diamine, dehydroabietylamine, N-(lower)alkylpiperidines such as N-ethylpiperidine, and the like. Tertiary-amine salts are preferable.

Suitable acid deactivating tertiary amines include amongst others triethylamine, dimethylaniline, quinoline, lutidine, pyridine, etc. The quantity of acid deactivating amine used is preferably an amount equivalent to about 75% of the total acid generated in the process by the halogenating agent and the halosilane compound reacting with compound III.

Suitable silyl compounds of Formulas IV and V are: trimethyl chlorosilane, hexamethyl disilazane, triethyl chlorosilane, methyl trichlorosilane, dimethyl dichlorosilane, triethyl bromosilane, tri-n-propyl chlorosilane, bromomethyl dimethyl chlorosilane, tri-n-butyl chlorosilane, methyl diethyl chlorosilane, dimethyl ethyl chlorosilane, phenyl dimethyl bromosilane, benzyl methyl ethyl chlorosilane, phenyl ethyl methyl chlorosilane, triphenyl chlorosilane, triphenyl fluorosilane, tri-o-tolyl chlorosilane, tri-p-dimethylaminophenyl chlorosilane, N-ethyl triethyl silylamine, hexaethyl disilazane, triphenyl silylamine, tri-n-propyl silylamine, tetraethyl dimethyl disilazane, tetramethyl diethyl disilazane, tetramethyl diphenyl disilazane, hexaphenyl disilazane, hexa-p-tolyl disilazane, etc. The same effect is produced by hexa-alkylcyclotrisilazanes or octa-alkylcyclotetrasilazanes. Other suitable silylating agents are silylamides and silylureides such as trialkylsilylacetamide and a bis-trialkylsilylacetamide.

The imino compound is preferably an imino chloride or bromide which can be prepared by reacting the silyl ester of Compound III with a halogenating agent such as phosphorus pentachloride, phosphorus pentabromide, phosphorus trichloride, phosphorus tribromide, oxalyl chloride, p-toluene sulfonic acid halide, phosphorus oxychloride, phosgene, etc., under anhydrous conditions in the presence of acid binding agents at temperatures preferably below 0° C. such as —40° to —60° C.

A very important step for high yields of the process of the present invention is the formation of the imino ether by reacting the imino halide under anhydrous conditions with a primary or secondary alcohol at temperatures between —20° and —70° C., preferably about —40° C. to —70° C. Temperatures higher than —40° C. result in a substantial reduction in yield.

Suitable alcohols for producing the imino ethers from the imino-halides are primary and secondary alcohols having the general formula $R^{10}OH$ in which $R^{10}$ is selected from the group consisting of (A) (lower)alkyl, having 1 to 12 carbon atoms, preferably having 1–3 carbon atoms, such as methanol, ethanol, propanol, isopropanol, n-butanol, amyl alcohol, decanol, etc.; (B) phenylalkyl having 1 to 7 alkyl atoms, such as benzyl alcohol, 2-phenylethanol-1, etc.; (C) cycloalkyl, such as cyclohexylalcohol, etc.; (D) hydroxyalkyl having 2 to 12 carbon atoms, preferably at least 3 carbon atoms, such as 1,6-hexanediol, etc.; (E) alkoxyalkyl having 3 to 12 carbon atoms, such as 2-methoxyethanol, 2 - isopropoxyethanol, 2-butoxyethanol, etc.; (F) aryloxyalkyl, having 3 to 7 carbon atoms in the aliphatic chain, such as 2-p-chlorophenoxyethanol, etc.; (G) aralkoxyalkyl, having 3 to 7 carbon atoms in the aliphatic chain, such as 2-(p-methoxybenzyloxy)-ethanol, etc.; (H) hydroxyalkoxyalkyl, having 4 to 7 carbon atoms, such diglycol. Also mixtures of these alcohols are suitable for forming the imino ethers.

After formation of the imino-ether from the iminohalide, the imino bond must be split to produce 7–ACA. The process is accomplished by mild hydrolysis or alcoholysis. If the quantity of acid deactivating tertiary amine present in the process is a quantity less than the acid produced by the silylation and halogenation, the cleavage will probably proceed simultaneously upon completion of the formation of the imino-ether. If however the quantity of acid deactivating amine was more than the acid produced, the cleavage step will require the careful addition of a quantity of H+ to effect the cleavage.

The 7–ACA is harvested from the reaction mixture by adjusting the pH of the mixtures to or near the isoelectric point of the 7–ACA, following which the 7–ACA crystallizes and is collected by filtration.

For optimum yields of 7–ACA, it is preferred to use high concentrations of the reactants. For example, in the formation of the silyl esters, a 20% to 30%, preferably 25% by weight of Compound III is suspended in an inert organic solvent and a base for the best results. The silane is employed preferably in excess, i.e. 10% to 60%, above theoretical amounts.

One molecule of cephalosporin C derivative III possesses two reactive carboxyl groups capable of forming silyl esters. Therefore, in terms of the silylation reaction, one mole of III is equal to two equivalent weights. Accordingly, when compound III is treated with dichlorodimethylsilane, one molecule of compound III (two equivalent weights) is treated with at least one molecule (two equivalent weights) of dichlorodimethylsilane. Similarly, when compound III is treated with chlorotrimethylsilane, one molecule of compound III (two equivalent weights) is treated with at least two molecules (two equivalent weights) of chlorotrimethylsilane.

This enables the use of solvents which are not absolutely dry because trace amounts of water are removed therefrom by reacting with the excess silylating agent. Obviously the quantity of the silane compound required is dependent upon whether one or both carboxyl groups of the compound III are available for silyl ester formation. The reaction scheme is illustrated below:

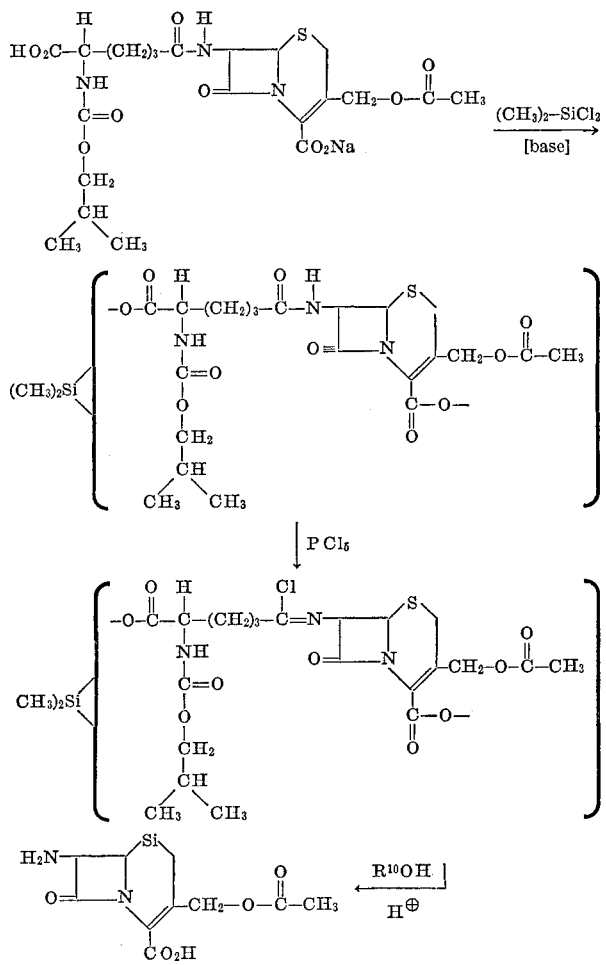

The following examples illustrate, but do not limit the scope of the present invention.

DESCRIPTION OF THE PREFERRED EMBODIMENTS

EXAMPLE 1

"In situ" preparation of sodium N-carbisobutoxy-cephalosporin C

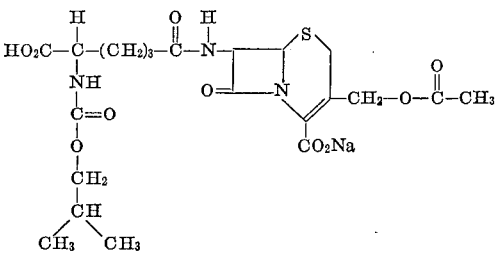

Twenty-nine hundred liters of whole fermentation broth containing cephalosporin C was mixed with 108 kg. of a filtering aid and 300 ml. of silicone antifoam and then filtered at pH 6.9 at 10° C.

Sufficient oxalic acid was added to the filtered broth to make the pH 3.1. Following this addition, the pH was adjusted to pH 2 by the addition of 30% sulfuric acid. Fresh filtering aid, 54 kg., was added and the mixture was filtered. The filtrate thus obtained was extracted with ½ volume of methyl isobutyl ketone (MIBK) at pH 2 and then separated. The MIBK phase was discarded.

One-fourth volume of acetone was added to the extracted broth and the pH was adjusted to 7.85 with a solution of sodium hydroxide. Two kilograms of isobutylchloroformate per 1000 liters of filtered broth was added slowly with stirring (a molar ratio of 5.9 moles of isobutylchloroformate per mole of cephalosporin C. The pH was constantly maintained at pH 7.8 to 8.0 by the addition of 15% sodium hydroxide and the temperature was held in the range of 0° C. to 10° C. during the addition. Stirring was continued until the pH remained constant without the addition of further sodium hydroxide, a time of about 2 hours.

The pH was adjusted to pH 2 by the addition of 30% sulfuric acid and the acylated broth was extracted with one-half volume of MIBK. The MIBK phase was water-washed and then concentrated to approximately one-third the starting volume at 36° C. in vacuo. The water content of the concentrate was 0.2% (Karl Fisher.

The concentrate was cooled and a solution of sodium ethylhexanoate in MIBK was added to pH 4.8. The sodium salt of N-carbisobutoxycephalosporin C precipitated and was collected by filtration. The precipitate was washed with MIBK, re-slurried in petroleum ether, filtered and dried in a vacuum oven at 40° to 60° C. to yield 7.2 kg. of product. Assay of the spent broth indicated the presence of less than 1% cephalosporin C activity. The product collected was estimated to be 42% to 50% pure sodium N-carbisobutoxycephalosporin C. The product was of adequate purity for the subsequent preparation of 7-aminocephalosporanic acid.

EXAMPLE 2

Preparation of 7-aminocephalosporanic acid

Sodium N-carbisobutoxycephalosporin C [13.5 grams] obtained from Example 1, 45 ml. of methylene chloride, 3.0 ml. of dimethylaniline and 3.67 ml. of triethylamine were mixed together. Dichlorodimethylsilane (6.2 ml.) was added with stirring at a temperature of 28° C. The solution was stirred 40 minutes. The solution was then cooled to —60° C. and 12.0 grams of phosphorus pentachloride dissolved in 100 ml. of methylene chloride was added. An additional 11.0 ml. of dimethylaniline was added while the temperature of the reaction was kept below —40° C. The temperature was chilled to —73° C.

after 2 hours, and a mixture of 60 ml. of methanol and 2.5 ml. dimethylaniline chilled to −78° C. was added slowly. The temperature rose to −45° C. The mixture was stirred and recooled to −50° C. At the end of two hours, 55 ml. of water heated to +90° C. was added. The temperature rose to +3° C. The mixture was cooled in an ice bath and stirred for 4 minutes. Ammonium hydroxide (22 ml.) was added over 8 minutes to a pH of 3.7. The mixture was stirred several hours and then filtered. The precipitate was collected, washed with 50 ml. of methylene chloride, then 40 ml. of water, then 50 ml. of methanol and finally 50 ml. of acetone. The solid was dried to yield 2.25 grams of 92.5% 7–ACA.

EXAMPLE 3

"In situ" preparation of sodium N-carbisobutoxy-cephalosporin C

Substitution in the procedure of Example 1 for the 5.9:1 molar ratio of isobutylchloroformate:cephalosporin C used therein of a 4.5:1 molar ratio produced 10.4 kg. of product. Assay of the spent broth after extraction indicated the presence of less than 14% cephalosporin C activity.

EXAMPLE 4

Preparation of 7-aminocephalosporanic acid

Sodium N-carbisobutoxycephalosporin C [13.5 g.] obtained from Example 3, 50 ml. of methylene chloride, 3 ml. of dimethylaniline and 3.67 ml. of triethylamine were mixed together. Dichlorodimethylsilane (6.2 ml.) was added with stirring at a temperature of 25°–29° C. The solution was stirred for 30 minutes, then cooled to −60° C. and 12.0 grams of $PCl_5$ in 100 ml, of methylene chloride was added. An additional 11.0 ml. of dimethylaniline in 10 ml. of methylene chloride was added. The temperature was maintained at −40° C. for 2 hours. The solution was cooled to −73° C. and a solution of 60 ml. methanol and 2.5 ml. dimethylaniline cooled to −78° C. was added. The temperature rose to −46° C. The temperature was held in the range of −45° C. to −50° C. for 2 hours. Fifty-five ml. of water warmed to 95° C. was added with stirring. The temperature rose to +5° C. After 4 minutes of stirring (pH 0.2), 22 ml. of $NH_4OH$ was added over a 7 minute interval to pH 3.8. Stirring was continued for several days with cooling. The precipitated 7–ACA was collected by filtration, washed with 50 ml. methylene chloride, 40 ml. water, 50 ml. methanol, then 50 ml. acetone. The dried solid weighed 2.3 grams and was 95.4% 7–ACA.

EXAMPLE 5

"In situ" preparation of sodium N-carbethoxy-cephalosporin C

Substitution in the procedure of Example 1 for the 5.9:1 molar ratio of isobutylchloroformate:cephalosporin C used therein of a 7.0:1 molar ratio of ethylchloroformate per mole of cephalosporin C produces sodium N-carbethoxycephalosporin C.

EXAMPLE 6

7–ACA from sodium N-carbethoxycephalosporin C

Sodium N-carbethoxycephalosporin C (12.0 grams) 45 ml. methylene chloride, 3.47 ml. of triethylamine and 7.0 ml. of N,N-dimethylaniline was added to a 500 ml. flask. The slurry was stirred and 4.75 ml. of dichlorodimethylsilane was added dropwise at 25°–28° C. The reaction was held at ~25° C. for 45 minutes. The reaction was chilled to −60° C. and 10.8 grams of $PCl_5$ (0.052 mole) in 100 ml. of methylene chloride was added at such a rate as to maintain the temperature at below −40° C. This was followed by 11.7 ml. of N,N-dimethylaniline while maintaining the temperature at −40° C. The reaction was maintained at −40° C. for two hours. The reaction was cooled to −73° C. and 60 ml. of methanol containing 2.36 ml. of N,N-dimethylaniline at −78° C.

was added in a quick pour to the reaction. The temperature raised to −43° C., the reaction was cooled to −50° C. and maintained at −50° C. for 2 hours. 45 ml. of water at +65° C. was added to the reaction and the reaction was warmed to +5° C. and stirred for 4 minutes. The pH was ≅0. Ten mls. of concentrated ammonium hydroxide was added dropwise over ~6 minutes (pH=1.6). The temperature was maintained at 0 to +5° C. with an ice bath. Five grams of ammonium carbonate in 10 ml. of water was added to the hydrolysis mixture (pH=3.0). The pH was then adjusted to 3.8 with 3.0 ml. of ammonium hydroxide. The crystallization mixture was stirred for two hours in an ice-bath and held in ice overnight for 16 hours. The crystals were filtered, washed with methylene chloride, 20 ml. of water, 50 ml. of methanol and acetone. The crystals were dried. 3.72 grams yield=58.2%.

EXAMPLE 7

"In situ preparation of sodium N-carbobenzoxy-cephalosporin C

Substitution in the procedure of Example 1 for the 5.9:1 molar ratio of isobutylchloroformate:cephalosporin C used therein of a 8.0:1 molar ratio of carbobenzoxy-chloride per mole of cephalosporin C produces sodium N-carbobenzoxycephalosporin C.

EXAMPLE 8

7–ACA from sodium N-carbobenzoxycephalosporin C

Substitution in the procedure of Example 6 for the sodium N-carbethoxycephalosporin C used therein of sodium N - carbobenzoxycephalosporin C produces 7–ACA.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:

1. The process for the "in situ" preparation and harvesting of a formate derivative of cephalosporin C having the formula

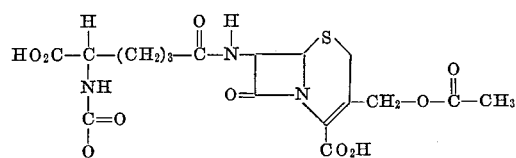

(III)

wherein R is (lower)alkyl or an aralkyl group of the formula

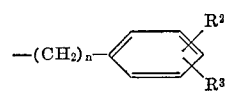

wherein $n$ is an integer of 1 to 6 and $R^2$ and $R^3$ are alike or different and each is H, Cl, Br, F, $NO_2$, (lower)alkyl or (lower)alkoxy; which comprises the consecutive steps of:

(A) adding a haloformate having the formula

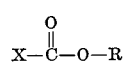

in which X is chloro, bromo, or iodo and R is as defined above, to an acid-incubated fermentation broth containing cephalosporin C, which was previously prepared by fermentation of a mold of the cephalosporium genus, in a ratio of at least 2 moles of haloformate per mole of cephalosporin C, at a pH above 7, at a temperature below 40° C., to form said formate derivative of cephalosporin C; and (B) recovering said formate derivative of cephalosporin C from the fermentation broth by extraction with a water-immiscible solvent.

2. The process of claim 1 for the "in situ" preparation and harvesting of a formate derivative of cephalosporin C having the formula

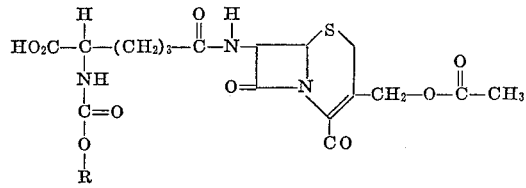

wherein R is (lower)alkyl or an aralkyl group of the formula

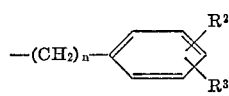

wherein $n$ is an integer of 1 to 6 and $R^2$ and $R^3$ are alike or different and each is H, Cl, Br, F, $NO_2$, (lower)alkyl or (lower)alkoxy; which comprises the consecutive steps of:

(A) adding a haloformate having the formula

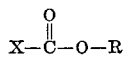

in which X is chloro, bromo, or iodo and R is as defined above, to a previously filtered and acid-incubated fermentation broth containing cephalosporin C, which was previously prepared by fermentation of a mold of the cephalosporium genus, in a ratio of about 2 to 10 moles of haloformate per mole of cephalosporin C, at a pH of about 7 to 9, at a temperature in the range of about 0° C. to about 25° C. to form said formate derivative of cephalosporin C; and (B) recovering said formate derivative of cephalosporin C by extraction using a water-immiscible organic solvent at a pH in the range of about 1 to 3.

3. The process of claim 1 for the "in situ" preparation and harvesting of a formate derivative of cephalosporin C having the formula

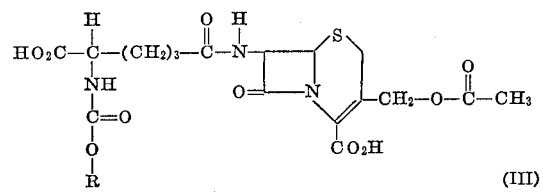

wherein R is (lower)alkyl or an aralkyl group of the formula

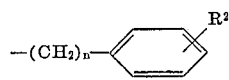

wherein $n$ is an integer of 1 to 6 and $R^2$ is H, Cl, Br, F, $NO_2$, (lower)alkyl or (lower)alkoxy; which comprises the consecutive steps of:

(A) adding a haloformate having the formula

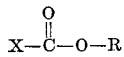

in which X is chloro, bromo, or iodo and R is as defined above, to a previously filtered and acid-incubated fermentation broth containing cephalosporin C, which was previously prepared by fermentation of a mold of the cephalosporium genus, in a ratio of about 5 to 8 moles of haloformate per mole of cephalosporin C, at a pH of about 7 to 9, at a temperature of about 0° C. to 15° C., to form said formate derivative of cephalosporin C; and (B) recovering said formate derivative of cephalosporin C by extraction using a water-immiscible organic solvent selected from the group consisting of methyl isobutyl ketone, ethylacetate, butanol, chloroform, methylene chloride and dichloroethane, at a pH in the range of about 1 to 3.

4. The process of claim 1 for the "in situ" preparation and harvesting of a formate derivative of cephalosporin C having the formula

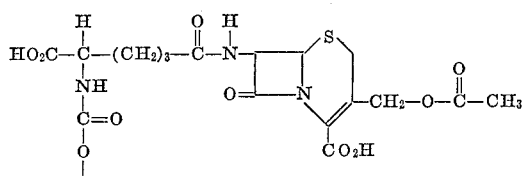

wherein R is ethyl, n-propyl, isopropyl, n-butyl or isobutyl; or an aralkyl group of the formula

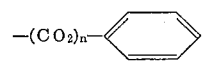

wherein $n$ is an integer of 1 to 6; which comprises the consecutive steps of:

(A) adding a haloformate having the formula

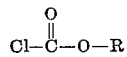

in which R is as defined above, to a previously filtered and acid-incubated fermentation broth containing cephalosporin C, which was previously prepared by fermentation of a mold of the cephalosporium genus, in a ratio of about 6 moles of chloroformate per mole of cephalosporin C, at a pH of about 8, at a temperature of about 0° C. to about 5° C., to form said formate derivative of cephalosporin C.; and (B) recovering said formate derivative of cephalosporin C by extraction using methyl isobutyl ketone at a pH of about 2.

5. The process of claim 1 for the "in situ" preparation and harvesting of a formate derivative of cephalosporin C having the formula

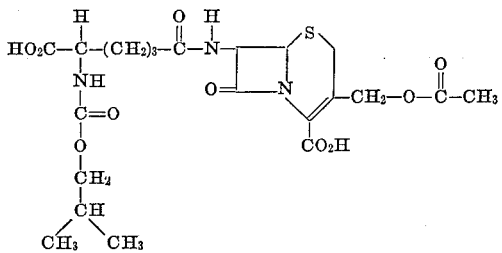

which comprises the consecutive steps of:

(A) adding isobutylchloroformate to a previously filtered and acid-incubated fermentation broth containing cephalosporin C, which was previously prepared by fermentation of a mold of the cephalosporium genus, in a ratio of about 6 moles of chloroformate per mole of cephalosporin C, at a pH of about 8, at a temperature of about 0° C. to about 5° C., to form said formate derivative of cephalosporin C; and (B) recovering said formate derivative of cephalosporin C by extraction using methyl isobutyl ketone at a pH of about 2.

6. The process for the preparation of 7-aminocephalosporanic acid which comprises the consecutive steps of:
(A) mixing a compound having the formula

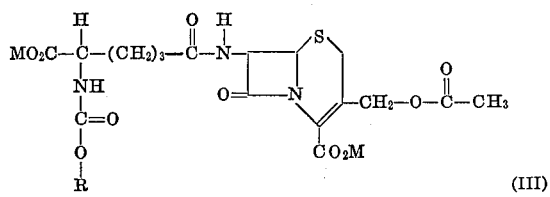

(III)

in which each M is selected from the group consisting of hydrogen, metal and amine cations, and R is (lower)alkyl or an aralkyl group of the formula

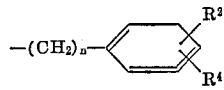

wherein $n$ is an integer of 1 to 6 and $R^2$ and $R^3$ are alike or different and each is H, Cl, Br, F, $NO_2$, (lower)alkyl or (lower)alkoxy; with a silyl compound of the formula

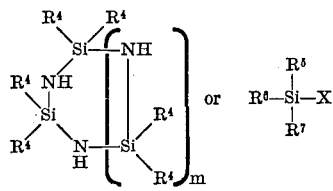

wherein $R^5$, $R^6$ and $R^7$ are selected from the group consisting of hydrogen, halogen, (lower)alkyl, halo-(lower)alkyl and phenyl, at least one of the said $R^5$, $R^6$ and $R^7$ groups being other than halogen or hydrogen; $R^4$ is (lower)alkyl, $m$ is an integer of 1 to 2 and X is selected from the group consisting of halogen and

wherein $R^8$ is hydrogen or (lower)alkyl and $R^9$ is hydrogen, (lower)alkyl or

under anhydrous conditions, in a ratio of at least one equivalent of silylating agent per equivalent of compound III, in the presence of an acid deactivating tertiary amine selected from the group consisting of triethylamine, trimethylamine, dimethylaniline, quinoline, lutidine and pyridine, in an inert solvent selected from the group consisting of methylene chloride, dichloroethane, chloroform, tetrachloroethane, nitromethane and diethyl ether, to produce the corresponding silyl ester of compound III;
(B) mixing said silyl ester with a halogenating agent selected from the group consisting of phosphorus pentachloride, phosphorus pentabromide, phosphorus trichloride, phosphorus tribromide, oxalyl chloride, p-toluenesulfonyl halide, phosphorus oxychloride and phosgene, in a molar ratio of 2 to 4 moles of halogenating agent per mole of silyl ester, under anhydrous conditions in an inert organic solvent such as methylene chloride, dichloroethane, chloroform, tetrachloroethane, nitromethane or diethyl ether, in the presence of an acid deactivating tertiary amine such as trimethylamine, triethylamine, dimethylaniline, quinoline, lutidine or pyridine, at temperatures in the range of $-10°$ C. to $-60°$ C. to produce in solution the corresponding imino-halide;

(C) mixing with said solution of imino-halide an alcohol selected from the group consisting of aliphatic alcohols having 1 to 12 carbon atoms and phenylalkyl alcohols having 1 to 7 alkyl carbon atoms, at a temperature in the range of $-20°$ C. to $-70°$ C. to produce in the solution the corresponding imino-ether; and
(D) mixing said solution of imino-ether under acidic conditions with water or an aliphatic alcohol, or a mixture of both, at a temperature about $0°$ C., to produce 7-aminocephalosporanic acid.

7. The process of claim 6 for the preparation of 7-aminocephalosporanic acid which comprises the consecutive steps of:
(A) mixing a compound having the formula

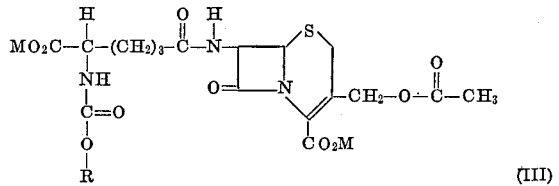

(III)

in which each M is selected from the group consisting of hydrogen, metal and amine cations, and R is ethyl, n-propyl, isopropyl, n-butyl or isobutyl; or an aralkyl group of the formula

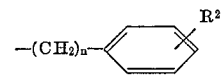

wherein $n$ is an integer of 1 to 6 and $R^2$ is H, Cl, Br, F, $NO_2$, (lower)alkyl or (lower)alkoxy; with a silyl compound of the formula

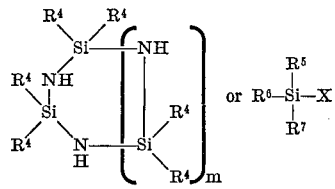

wherein $R^5$, $R^6$ and $R^7$ are selected from the group consisting of hydrogen, halogen, (lower)alkyl, halo-(lower)alkyl and phenyl, at least one of the said $R^5$, $R^6$ and $R^7$ groups being other than halogen or hydrogen; $R^4$ is (lower)alkyl, $m$ is an integer of 1 to 2 and X is selected from the group consisting of halogen and

wherein $R^8$ is hydrogen or (lower)alkyl and $R^9$ is hydrogen, (lower)alkyl or

under anhydrous conditions in a ratio of about 1.2 to about 2 equivalents of silylating agent per equivalent of compound III, in the presence of an acid deactivating tertiary amine selected from the group consisting of trimethylamine, triethylamine, dimethylaniline, quinoline, lutidine and pyridine in an inert organic solvent selected from the group consisting of methylene chloride, dichloromethane, chloroform, tetrachloroethane, nitromethane and diethyl ether, to produce the corresponding silyl ester of compound III;

(B) mixing said silyl ester with a halogenating agent selected from the group consisting of phosphorus pentachloride and phosphorus oxychloride, in a molar ratio of 2 to 3 moles of halogenating agent per mole of silyl ester, under anhydrous conditions in an inert organic solvent such as methylene chloride, dichloroethane, chloroform or tetrachloroethane, in the presence of a tertiary amine such as triethylamine, dimethylaniline or pyridine, at temperatures in the range of −40° C. to −60° C., to produce in solution the corresponding imino-halide;

(C) mixing with said solution of imino-halide an alcohol such as methanol, ethanol, n-propanol or isopropanol, at a temperature in the range of −40° C. to −70° C., to produce in the solution the corresponding imino-ether; and (D) mixing said solution of imino-ether under acidic conditions with water or an alcohol selected from the group consisting of methanol, ethanol, n-propanol or isopropanol, or a mixture thereof, at a temperature in the range of about −10° C. to about +10° C., to produce 7-aminocephalosporanic acid.

8. The process of claim 7 wherein R is ethyl, n-propyl, isopropyl, n-butyl or isobutyl;
the silyl compound is dimethyldichlorosilane or trimethylchlorosilane;
the inert organic solvent is methylene chloride or dichloroethane; and
the halogenating agent is phosphorous pentachloride and it is used in a molar ratio of 2 moles of phosphorous pentachloride per mole of silyl ester.

9. The process of claim 8 wherein R is isobutyl.

10. The process for the "in situ" preparation and harvesting of a derivative of cephalosporin C and its subsequent cleavage to 7-aminocephalosporanic acid which comprises the consecutive steps of:

(A) adding to a previously filtered and acid-incubated fermentation broth containing cephalosporin C which was previously prepared by fermentation of a mold of the cephalosporium genus a haloformate having the formula

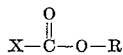

wherein X is chloro, bromo, or iodo, R is (lower) alkyl or an aralkyl group of the formula

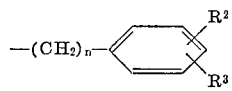

wherein $n$ is an integer of 1 to 6 and $R^2$ and $R^3$ are alike or different and each is H, Cl, Br, F, $NO_2$, (lower)alkyl or (lower)alkoxy; in a ratio of about 2 to 10 moles of haloformate per mole of cephalosporin C, at a pH of about 7 to 9, at a temperature in the range of about 0° C. to about 25° C. to produce a derivative of cephalosporin C having the formula

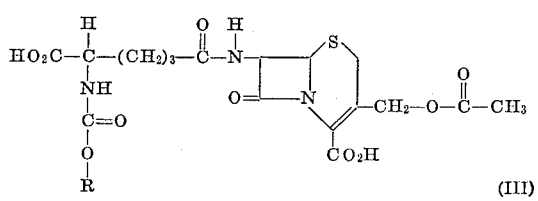

(III)

in which R is as defined above;

(B) recovering said derivative of cephalosporin C by extraction using a water-immiscible organic solvent at a pH in the range of about 1 to 3;

(C) mixing the cephalosporin C derivative, or a salt thereof, with a silyl compound of the formula

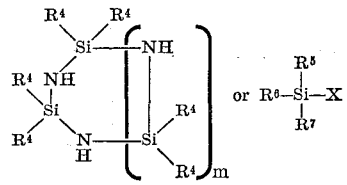

wherein $R^5$, $R^6$ and $R^7$ are selected from the group consisting of hydrogen, halogen, (lower)alkyl, halo(lower)alkyl and phenyl, at least one of the said $R^5$, $R^6$ and $R^7$ groups being other than halogen or hydrogen; $R^4$ is (lower)alkyl, $m$ is an integer of 1 to 2 and X is selected from the group consisting of halogen and

wherein $R^8$ is hydrogen or (lower)alkyl and $R^9$ is hydrogen, (lower)alkyl or

under anhydrous conditions, in a ratio of at least one equivalent of silylating agent per equivalent of compound III, in the presence of an acid deactivating tertiary amine selected from the group consisting of triethylamine, trimethylamine, dimethylaniline, quinoline, lutidine and pyridine, in an inert solvent selected from the group consisting of methylene chloride, dichloroethane, chloroform, tetrachloroethane, nitromethane and diethyl ether, to produce the corresponding silyl ester of compound III;

(D) mixing said silyl ester with a halogenating agent selected from the group consisting of phosphorus pentachloride, phosphorus pentabromide, phosphorus trichloride, phosphorus tribromide, oxalyl chloride, p-toluenesulfonyl halide, phosphorus oxychloride and phosgene, in a molar ratio of 2 to 4 moles of halogenating per mole of silyl ester, under anhydrous conditions in an inert organic solvent such as methylene chloride, dichloroethane, chloroform, tetrachloroethane, nitromethane, in the presence of an acid deactivating tertiary amine such as trimethylamine, triethylamino, dimethylaniline, quinoline, lutidine or pyridine, at temperatures in the range of −10° C. to −60° C. to produce in solution the corresponding imino-halide;

(E) mixing with said solution of imino-halide an alcohol selected from the group consisting of aliphatic alcohols having 1 to 12 carbon atoms and phenylalkyl alcohols having 1 to 7 alkyl carbon atoms, at a temperature in the range of −20° C. to −70° C. to produce in the solution the corresponding iminoether; and (F) mixing said solution of imino-ether under acidic conditions with water or an aliphatic alcohol, or a mixture of both, at a temperature about 0° C., to produce 7-aminocephalosporanic acid.

11. The process of claim 10 which comprises the consecutive steps of (A) adding to a previously filtered and acid-incubated fermentation broth containing cephalosporin C which was previously prepared by fermentation of a mold of the cephalosporium genus a chloroformate having the formula

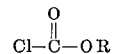

wherein R is ethyl, n-propyl, n-butyl or isobutyl; in a ratio of about 6 moles of chloroformate per mole of cephalosporin C, at a pH of about 8, at a temperature of about 0° C. to about 15° C., to produce a derivative of cephalosporin C having the formula

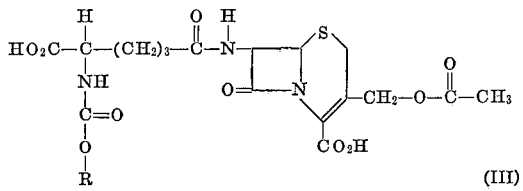

(III)

in which R is as defined above;

(B) recovering said derivative of cephalosporin C by extraction using methyl isobutyl ketone at a pH of about 2;

(C) mixing the cephalosporin C derivative, or a salt thereof, with a silyl compound such as dimethyldichlorosilane or trimethylchlorosilane under anhydrous conditions, in a ratio of about 1.2 to 2 equivalents of silylating compound per equivalent of compound III, in the presence of an acid deactivating group selected from the group consisting of trimethylamine, triethylamine, dimethylaniline, quinoline, lutidine and pyridine, in an inert organic solvent such as methylene chloride or dichloroethane, to produce the corresponding silyl ester of compound III;

(D) mixing said silyl ester with phosphorus pentachloride, in a molar ratio of 2 to 3 moles of halogenating agent per mole of silyl ester, under anhydrous conditions in a solvent such as methylene chloride, chloroform, or dichloroethane, in the presence of triethylamine, dimethylaniline or pyridine, at temperatures in the range of −40° C. to −60° C., to produce in solution the corresponding imino-halide;

(E) mixing with said solution of imino-halide an alcohol such as methanol, ethanol, n-propanol or isopropanol, at a temperature in the range of −40° C. to −70° C., to produce in the solution the corresponding imino ether; and (F) mixing said solution of imino-ether under acidic conditions with water or an alcohol selected from the group consisting of methanol, ethanol, n-propanol or isopropanol, or a mixture thereof, at a temperature in the range of about −10° C. to about +10° C. to produce 7-aminocephalosporanic acid.

References Cited
UNITED STATES PATENTS 3,499,909   3/1970   Weissenburger et al. __ 260—306.7
3,188,311   6/1965   Morin et al. _____ 260—243

NICHOLAS S. RIZZO, Primary Examiner